(12) United States Patent
Kennemer

(10) Patent No.: US 11,805,730 B1
(45) Date of Patent: Nov. 7, 2023

(54) TOOL ARM SUPPORT ATTACHMENT

(71) Applicant: Dylan Kennemer, Rosharon, TX (US)

(72) Inventor: Dylan Kennemer, Rosharon, TX (US)

( * ) Notice: Subject to any disclaimer, the term of this patent is extended or adjusted under 35 U.S.C. 154(b) by 548 days.

(21) Appl. No.: 16/801,999

(22) Filed: Feb. 26, 2020

Related U.S. Application Data

(60) Provisional application No. 62/810,731, filed on Feb. 26, 2019.

(51) Int. Cl.
*A01D 34/90* (2006.01)
*A01D 34/00* (2006.01)
*A01D 34/416* (2006.01)
*A01D 101/00* (2006.01)

(52) U.S. Cl.
CPC ............ *A01D 34/902* (2013.01); *A01D 34/001* (2013.01); *A01D 34/416* (2013.01); *A01D 2101/00* (2013.01)

(58) Field of Classification Search
CPC ... B25G 1/06; B25G 1/102; A01B 1/00; Y10T 16/476; A01D 2101/00; A01D 34/001; A01D 34/416; A01D 34/90; A01D 34/902
See application file for complete search history.

(56) References Cited

U.S. PATENT DOCUMENTS

| | | | | |
|---|---|---|---|---|
| 4,179,805 A * | 12/1979 | Yamada | ............ | B27B 17/0008 30/296.1 |
| 5,379,758 A * | 1/1995 | Snyder | ................. | B25G 1/102 15/235.4 |
| 5,809,614 A * | 9/1998 | Kretser, Jr. | .............. | A01B 1/00 16/422 |
| 5,890,259 A * | 4/1999 | Sarac | ...................... | A01B 1/00 16/901 |
| 6,082,795 A * | 7/2000 | Fornelli | ................... | A01B 1/00 294/51 |
| 6,464,272 B1 * | 10/2002 | Michaud | ................. | B25G 1/00 294/58 |
| 6,598,266 B1 * | 7/2003 | Elliott | ..................... | A01B 1/00 16/901 |
| 6,880,251 B2 * | 4/2005 | Gambert | ............. | A01D 34/902 30/296.1 |
| 7,464,441 B2 * | 12/2008 | Peach | ..................... | B62B 1/18 298/3 |
| 7,930,795 B1 * | 4/2011 | Johnston | ................. | A47L 1/16 15/236.01 |
| 8,464,399 B2 * | 6/2013 | Herigstad | ............... | A47J 45/06 16/424 |
| 8,776,648 B2 * | 7/2014 | Lee | ....................... | B25G 1/102 81/489 |
| 9,931,701 B1 * | 4/2018 | Klein et al. | ........... | B25H 1/0021 |
| 10,179,401 B2 * | 1/2019 | Nyland | .................. | B25G 1/102 |

(Continued)

FOREIGN PATENT DOCUMENTS

| | | | | |
|---|---|---|---|---|
| CN | 207543620 U * | 6/2018 | .................. | A01D 34/90 |
| KR | 101186020 B1 * | 9/2012 | .................. | A01D 34/67 |

OTHER PUBLICATIONS

Ziptrim, Jun. 18, 2018, https://www.youtube.com/watch?v=9xluU6JmaGY.*

*Primary Examiner* — Adam J Behrens
(74) *Attorney, Agent, or Firm* — Leavitt Eldredge Law Firm

(57) ABSTRACT

An arm support tool attachment includes a shaft extending from a first end to a second end; a clamp positioned at the second end of the shaft, the clamp to removably secure to a handle portion of a tool; and a cuff having an elongated channel to receive and support a user's arm, the cuff attached to the shaft at the first end; the shaft extends the cuff away from the handle portion of the tool such that the cuff provides user support.

2 Claims, 4 Drawing Sheets

(56) References Cited

U.S. PATENT DOCUMENTS

| | | | |
|---|---|---|---|
| 10,448,552 B2* | 10/2019 | Ahearn | A01B 1/022 |
| 11,013,172 B2* | 5/2021 | Carl | A01D 34/4167 |
| 11,027,408 B2* | 6/2021 | Rizzo | B25F 5/02 |
| 11,297,766 B1* | 4/2022 | Wynn-Grayson | A01D 34/416 |
| 2002/0121042 A1* | 9/2002 | Macaluso | B25G 3/24 |
| | | | 43/21.2 |
| 2003/0226262 A1* | 12/2003 | Gambert | B25F 5/02 |
| | | | 30/276 |
| 2008/0168625 A1* | 7/2008 | Peach | B62B 1/18 |
| | | | 16/426 |
| 2011/0099765 A1* | 5/2011 | Youssefieh | B25G 1/102 |
| | | | 15/147.1 |
| 2012/0180445 A1* | 7/2012 | Duller | A01D 34/902 |
| | | | 56/12.7 |
| 2015/0367499 A1* | 12/2015 | Arketa Zabala | B25G 3/00 |
| | | | 15/143.1 |
| 2017/0001296 A1* | 1/2017 | Murphy | B05C 17/0205 |
| 2018/0103584 A1* | 4/2018 | Orton | A01D 34/416 |
| 2018/0126539 A1* | 5/2018 | Nyland | B25G 1/102 |
| 2020/0061796 A1* | 2/2020 | Jore et al. | B25F 3/00 |

* cited by examiner

TOOL ARM SUPPORT ATTACHMENT

BACKGROUND

1. Field of the Invention

The present invention relates generally to tools systems, and more specifically, to an attachment device for securing to tools, such as string trimmers, wherein the attachment device provides for improved user support while use of the tool.

2. Description of Related Art

Tools, such as yard tools, are well known in the art and are effective means to perform landscaping activities. For example, FIG. 1 depicts a conventional string trimmer 101 having a shaft 103 with one or more handles 105, 107 and a tool implement 109, in this case a weeder head. During use, the user typically utilizes two hands to hold onto the tool and perform landscaping activities.

One of the problems commonly associated with tool 101 is user fatigue. For example, the user's arms and back will generally become fatigued during use of the tool.

Accordingly, although great strides have been made in the area of tool systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
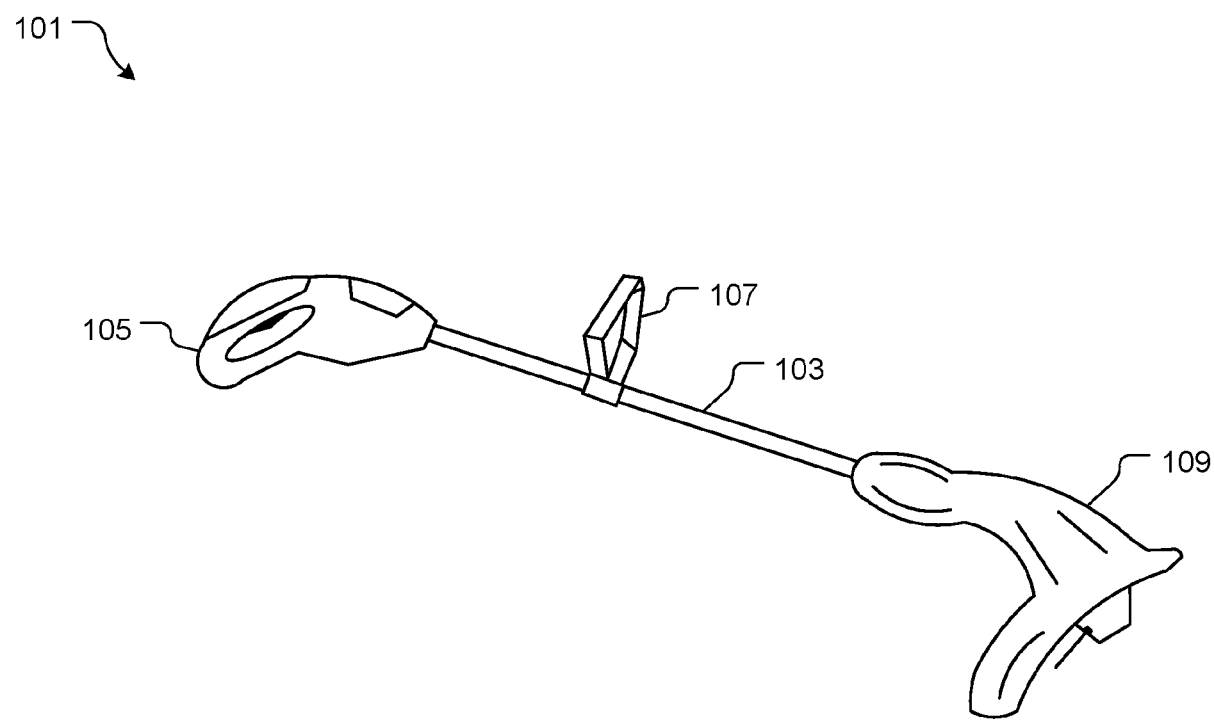
FIG. 1 is a side view of a common string trimmer tool system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional tool systems. Specifically, the present invention provides a means for improved user support while using a landscaping tool, such as a string trimmer. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
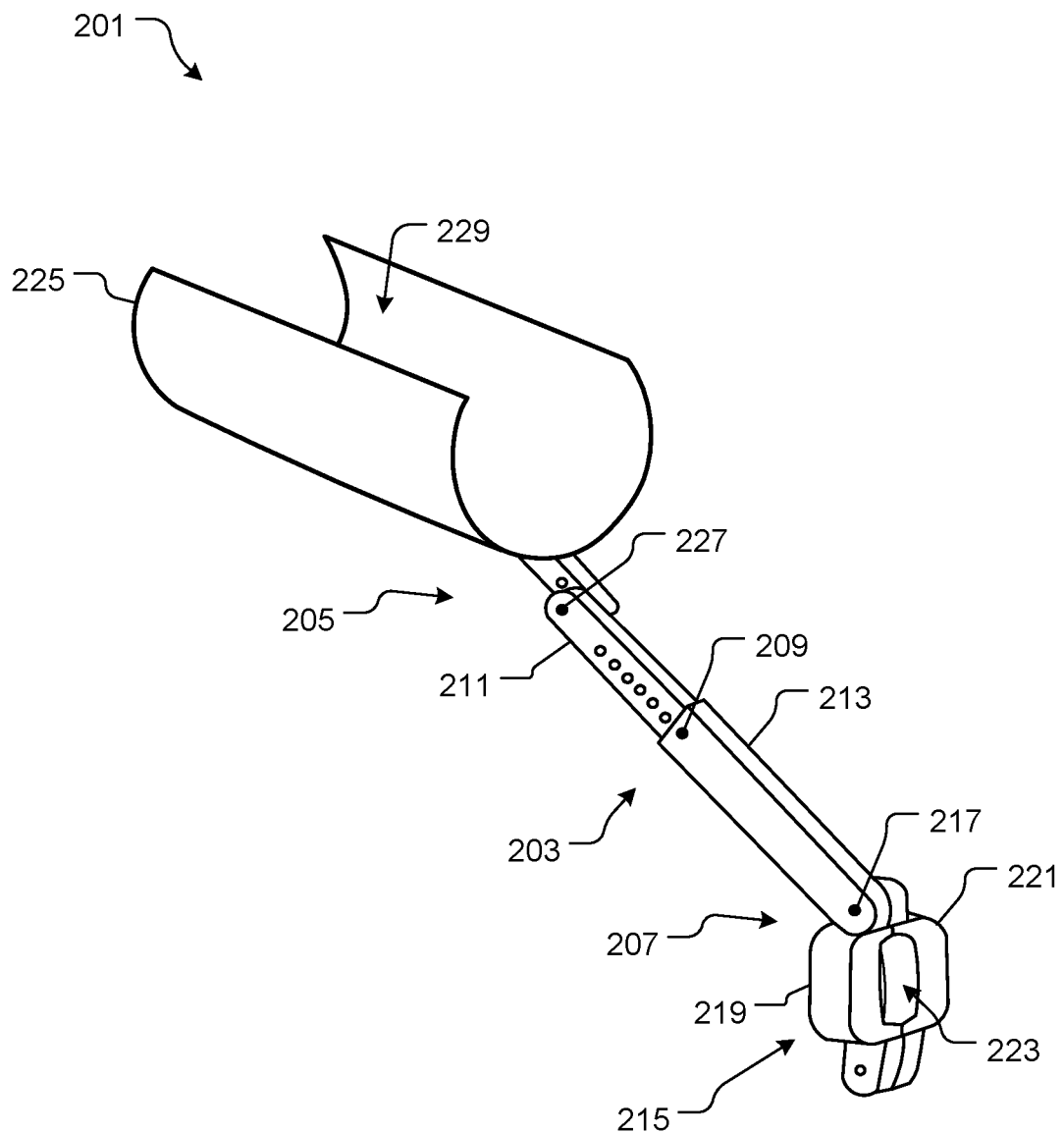
FIG. 2 is an isometric view of an attachment device in accordance with a preferred embodiment of the present application.

Referring now to the drawings wherein like reference characters identify corresponding or similar elements throughout the several views, FIG. 2 depicts an isometric view of an attachment device 201 in accordance with a preferred embodiment of the present application. It will be appreciated that device 201 overcomes one or more of the above-listed problems commonly associated with conventional tool systems.

In the contemplated embodiment, device 201 includes a shaft 203 extending from a first end 205 to a second end 207. In the preferred embodiment, the shaft 203 includes an adjustment means 209 that allows for the two or more components 211, 213 to slidingly engage and thereby adjust the length and positioning of the attachment device.

Attachment device 201 further includes a clamp 215 attached to shaft 203 at the second end 207 via a pivot point 217. The clamp 215 can vary in design, however, in one particular embodiment the clamp 215 includes a first side 219 and a second side 221 forming an opening 223 and configured to be secured together. The clamp 215 is configured to provide a means to secure the attachment device 201 to a tool, such as a string trimmer.

Device 201 further includes a cuff 225 attached to shaft 203 at a pivot point 227 and forming an elongated channel 229 configured to receive the user's arm during use.

Figure 3:
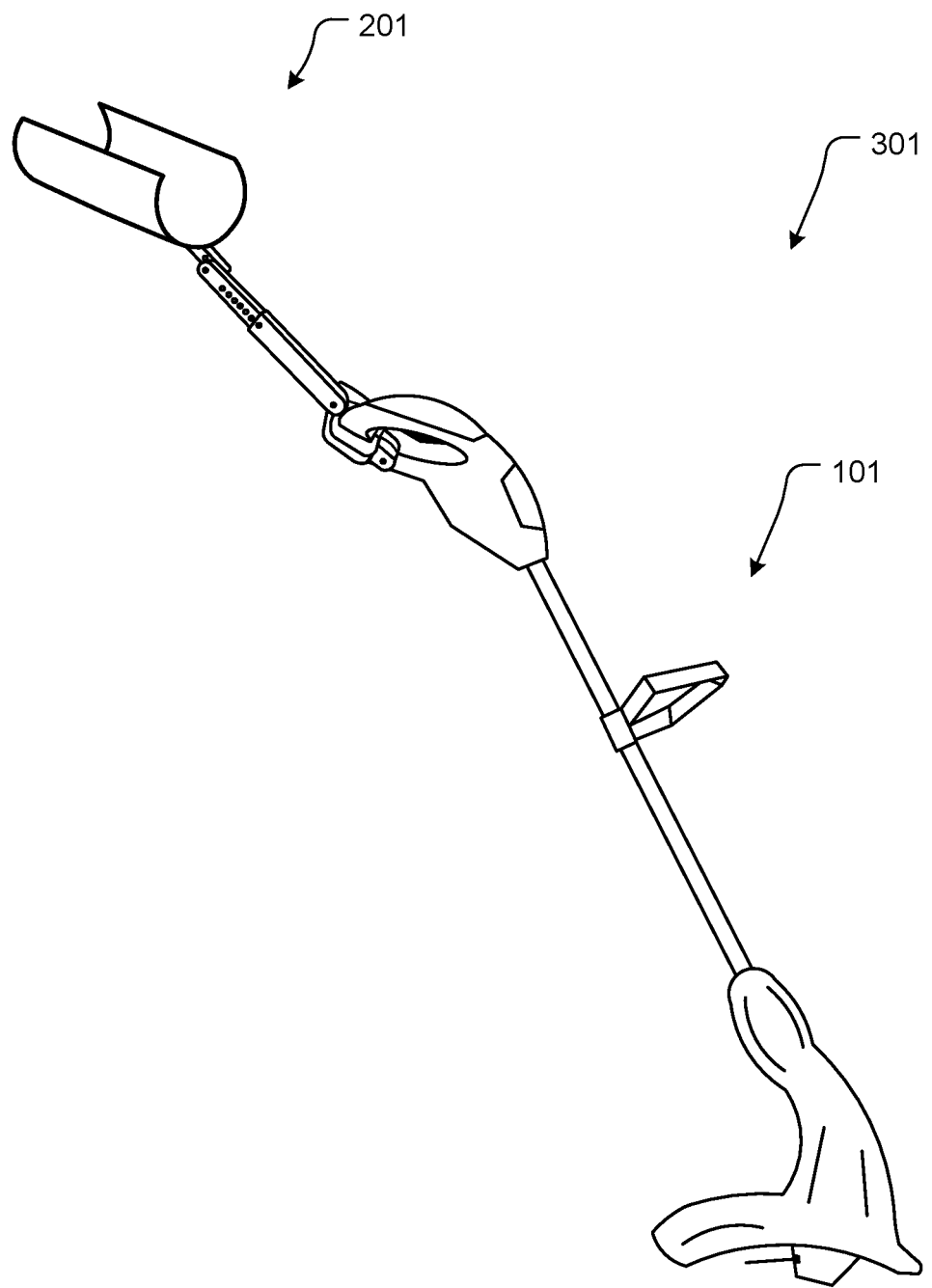
FIG. 3 is a side view of the attachment device of FIG. 2 connected to a string trimmer in accordance with the present application.

In FIG. 3, the attachment device 201 is shown attached to tool 101 forming a combination tool and attachment device 301. It should be appreciated that the attachment device 201 is configured to secure to the tool, wherein the user can use the cuff 225 for support, thereby reducing back pain and muscle fatigue while using the tool.

It should be appreciated that one of the unique features believed characteristic of the present application is the attachment device 201, wherein the use of device 201 with a tool provides the user with additional support and comfort. It should be appreciated that the attachment device 201 can be adapted for use with a plurality of tools.

Figure 4:
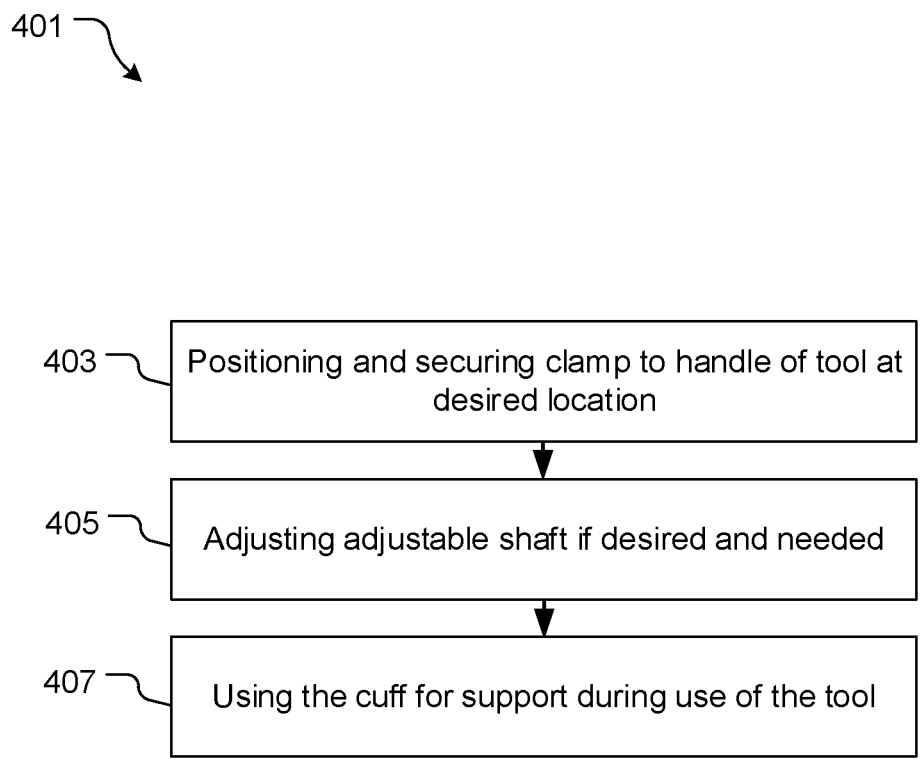
FIG. 4 is a flowchart of the method of use of the system of FIG. 3.

In FIG. 4, a flowchart 401 further depicts a method of use of combination 301. During use, the attachment device is secured to the tool at a desired location, such as to a handle or shaft, as shown with box 403. If needed, the user can adjust the length of the shaft of the device, as shown with box 405. The user can then utilize the cuff for support while using the tool, as shown with box 407.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination of a tool and arm support attachment device, the combination comprising:
   a tool having:
      an elongated tool shaft extending from a first side to a second side;
      a tool implement secured to the first side;
      an engine secured to the second side; and
      a handle secured between the first and second ends;
   an attachment device, having:
      a shaft extending from a first end to a second end, the shaft is adjustable such that the shaft extends from a first position to a second position, which in turn increases and decreases an elongated length of the shaft;
      a clamp pivotably positioned at the second end of the shaft, the clamp configured to removably secure to the elongated tool shaft of the tool, the clamp is configured to secure in a position between the engine and the tool implement; and
      a cuff having an elongated channel configured to receive and support a user's arm, the cuff is contoured to receive the arm, the cuff attached to the shaft at the first end, the cuff is pivotally attached to the shaft, the cuff extends at least partially over the engine and is configured to keep the user's arm in a fixed position from the engine;
   wherein the shaft extends the cuff away from the handle of the tool such that the cuff provides user support during use of the tool.

2. The combination of claim 1, wherein the tool is a string trimmer tool.

* * * * *